United States Patent [19]

Haley et al.

[11] Patent Number: 4,932,137
[45] Date of Patent: Jun. 12, 1990

[54] VERTICAL LEAP MEASURING APPARATUS AND METHOD

[76] Inventors: Frederick M. Haley, 7 Broomfield Dr.; James E. Walker, 5 Wheatridge Dr., both of Greenville, S.C. 29609

[21] Appl. No.: 368,194

[22] Filed: Jun. 19, 1989

[51] Int. Cl.$^5$ .......................... G01B 7/02; A63B 5/16
[52] U.S. Cl. ........................................ 33/700; 272/93; 273/1 GC
[58] Field of Search ................ 33/700, 701, 494, 293, 33/294, 784; 272/93, 100, 101, DIG. 45; 273/1 GC, 1 GE, 1 E

[56] References Cited

U.S. PATENT DOCUMENTS

| | | | |
|---|---|---|---|
| 2,469,145 | 5/1949 | Baliff | 272/93 |
| 3,006,644 | 10/1961 | Usher et al. | 272/93 |
| 3,534,956 | 10/1970 | Myers | 272/93 |
| 3,795,396 | 3/1974 | Kropeznitski | 272/93 |
| 4,208,050 | 6/1980 | Perrine et al. | 272/93 |
| 4,323,234 | 4/1982 | Glaebe | 33/494 |
| 4,693,598 | 9/1987 | Sehr | 33/293 |
| 4,718,171 | 1/1988 | Schlemmer et al. | 33/293 |

FOREIGN PATENT DOCUMENTS

| | | | |
|---|---|---|---|
| 0738628 | 6/1980 | U.S.S.R. | 272/101 |
| 0814371 | 3/1981 | U.S.S.R. | 272/101 |
| 1163868 | 6/1985 | U.S.S.R. | 272/101 |

*Primary Examiner*—Thomas B. Will
*Attorney, Agent, or Firm*—Bailey & Hardaway

[57] ABSTRACT

A vertical leap measuring apparatus and method is illustrated including a series of vertically spaced electric pressure-sensitive switches and a device for recording an indication reflecting height reached both from a standing position and subsequently from a vertical leap, wherein the difference between the two indications of height reached is calculated to determine the height of the vertical leap.

5 Claims, 3 Drawing Sheets

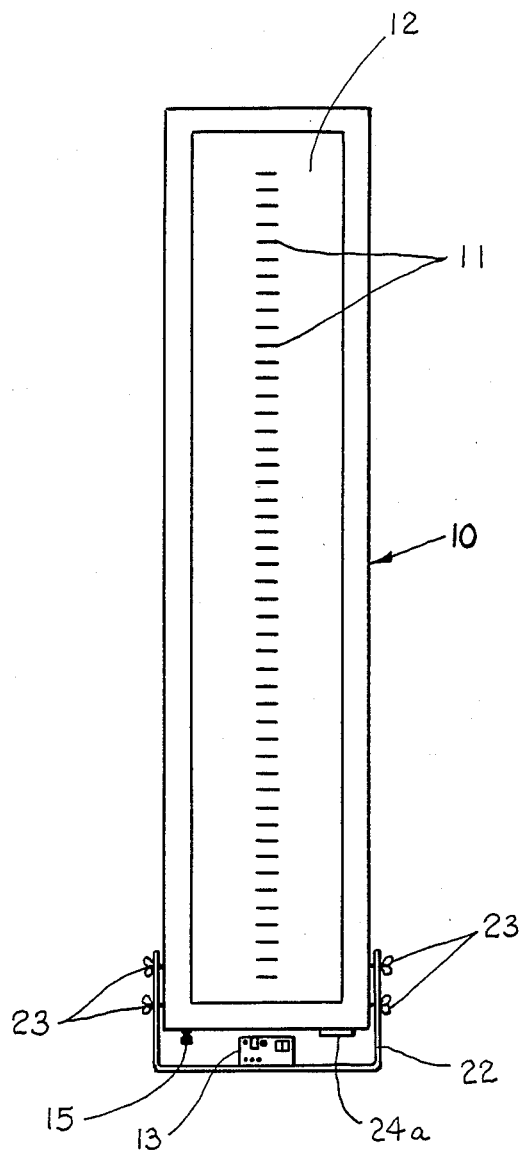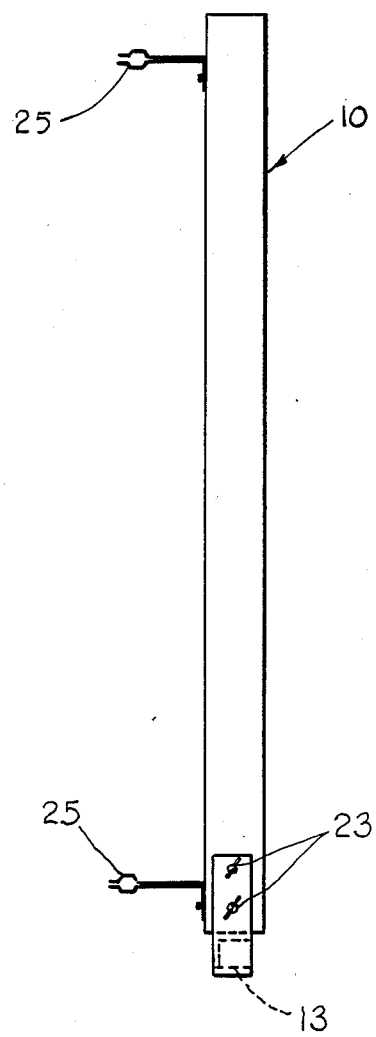

VERTICAL LEAP MEASURING APPARATUS AND METHOD

BACKGROUND OF THE INVENTION

This invention relates generally to apparatus and method for measuring the height of a person's vertical leap and more particularly to measuring the height of a person's reach from a standing position, then measuring the height of that person's reach from a vertical leap, and calculating the difference.

It is known that a person's jumping or leaping ability may be improved upon practice and that practice is encouraged by periodically providing an evaluation of the person's leaping ability. By measuring the person's vertical leap, an accurate evaluation is provided which serves to stimulate increased effort and performance.

A jump measuring device is disclosed in U.S. Pat. No. 2,469,145 and includes suspended bars which swing into position for use. The design of the apparatus of U.S. Pat. No. 3,258,266 includes hinged members which pivot to become perpendicular to a wall when in use. The jump practicing apparatus disclosed in U.S. Pat. No. 3,534,956 includes an elongated arm with spaced tabs mounted to a support in an outwardly extended, upwardly inclined position. The device of U.S. Pat. No. 3,795,396 suggests the use of switching means in combination with a gauge to indicate that the athlete has jumped a pre-selected vertical distance. The jump measuring apparatus of U.S. Pat. No. 4,208,050 discloses a series of horizontally extending vanes pivotally mounted for movement about a vertical axis. Such devices are complicated in their constructions and are unable to achieve the objectives of the instant invention as described below.

SUMMARY OF THE INVENTION

It is an important object of this invention to provide a novel and improved device for measuring vertical leap which includes a series of pressure-sensitive switches mounted vertically within a sturdy measurement unit.

It is also an important object of this invention to provide a means for recording an indication reflecting height reached by a person upwardly extending one hand so as to engage one of the pressure-sensitive switches from both a standing position and a vertical leap, such that the difference between recorded indications may be calculated to determine the height of the vertical leap.

Another important object of this invention is the provision of the vertical leap measuring device having a series of pressure-sensitive switches which may be mounted vertically and a means for recording an indication reflecting height which may be reached by a person upwardly extending one hand and engaging one of the switches both from a standing position and from a vertical leap so that the difference between the indications may be calculated.

It is a further important object of this invention to provide a novel vertical leap measuring device which is simple in construction, without hinged, pivoting or otherwise adjustable moving parts, and a device which is sturdy for accepting the impact of the jumper's tap.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a front elevation illustrating a vertical leap measuring device constructed in accordance with this invention;

FIG. 2 is a side elevation illustrating means for attaching indication recording means to a measurement unit and further illustrating means for mounting the apparatus in accordance with this invention;

DESCRIPTION OF A PREFERRED EMBODIMENT

Figure 3:
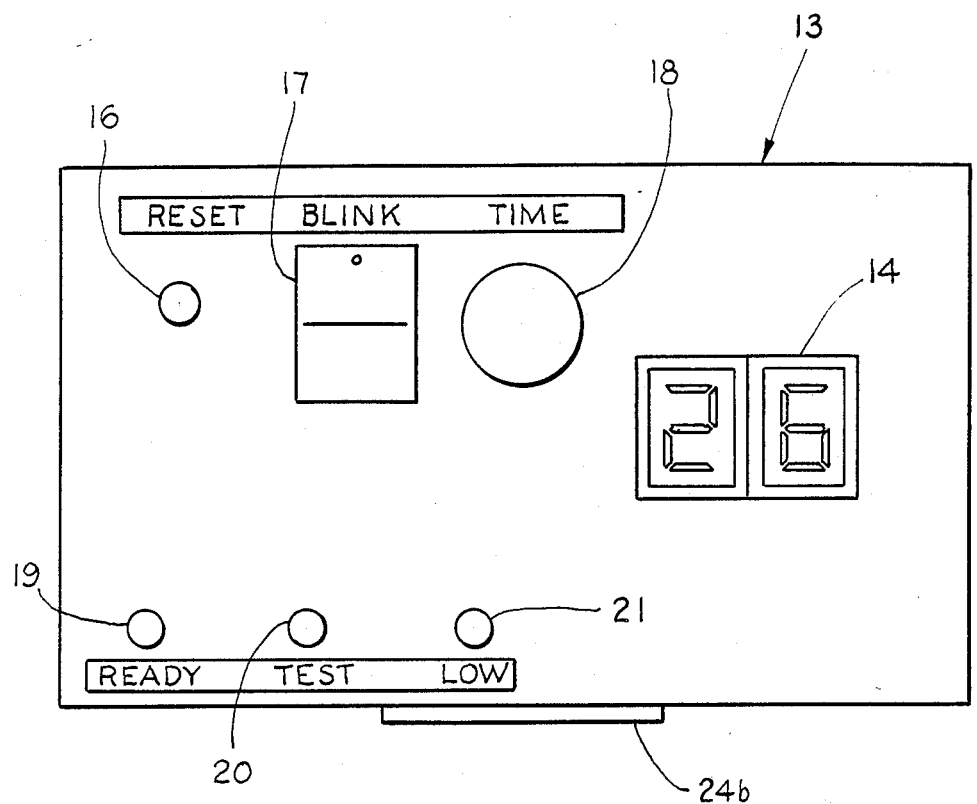
FIG. 3 is an enlarged front elevation illustrating means for recording an indication reflecting height reached by an individual in accordance with this invention.

A vertical leap measuring device is illustrated in FIG. 1 of the drawings having a series of electric pressure-sensitive switches mounted vertically within a measurement unit 10. The switches include pressure sensitive portions 11, which include indicia such as pieces of marker tape, placed vertically on the 12 standard at appropriate intervals, such as every inch. The apparatus includes a control indicator unit 13 for recording an indication reflecting height reached by a person upwardly extending one hand to engage the highest switch that can be reached. Height reached is indicated from a standing position and subsequently from a vertical leap. The difference between the two indications of height reached is instantaneously calculated and recorded by recording means 13 which provides a digital display 14 of the measurement, best seen in FIG. 3 of the drawings.

The apparatus further includes an on-off control 15 (FIG. 1) and includes a reset control 16, blink/non-blink display 17, time knob 18 and status indicators 19, 20 and 21 respectively of 'ready', 'testing' and 'low battery.' The recording means 13 is attached to the measurement unit 10 in a conventional manner, such as being mounted, with a bracket 22, and wing screws 23 or being connected by a cable (not shown) at cable connectors 24a and 24b.

Electronic circuitry includes Integrated Circuits to detect which switches have been engaged and to convert the information to data suitable for digital display. Operating power is derived from a rechargeable battery for safety reasons and for field operation in one preferred form of the invention, although other power sources including AC-rectifiers, automobile batteries and solar cells are also suitable.

Figure 4:
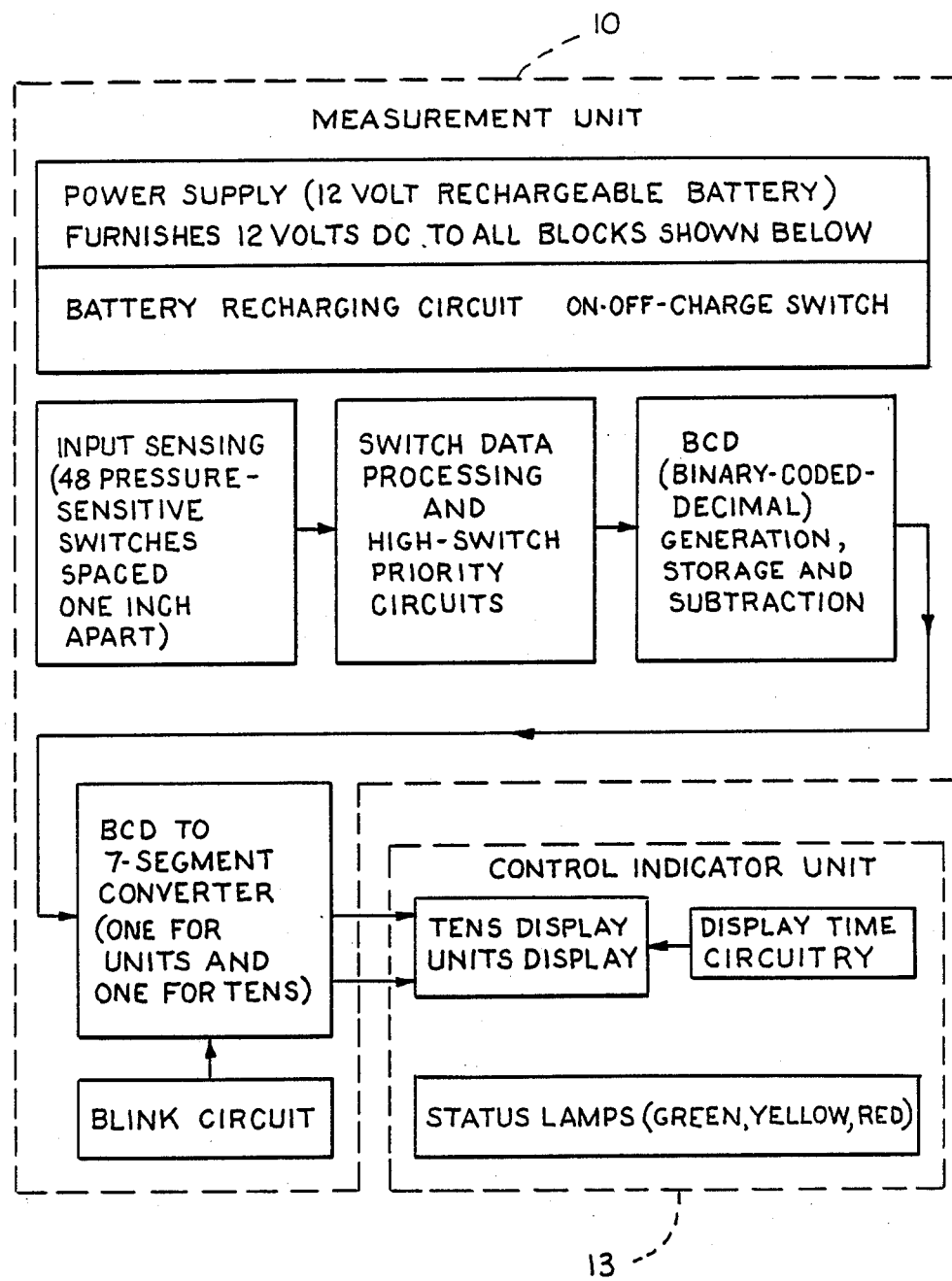
FIG. 4 is a block diagram illustrating the various electrical components of the apparatus.

The electrical components are schematically illustrated by the block diagram of FIG. 4.

The device of this invention is made of aluminum or other suitable material and is sturdy and simple in construction. It may be attached to a wall or any portable, adjustable device such as an extension ladder by mounting brackets 25 as seen in FIG. 2 of the drawings. Thus, the device may be raised or lowered to accommodate individuals having various reaching/leaping abilities, including athletes and others of various age groups.

The method of this invention is carried out by positioning a individual with upwardly extended hand immediately adjacent and in front of the measuring device. When activated, the 'ready' lamp 19 of the recording means 13 is on and the digital display 14 is blank. The individual in a standing position engages the highest switch that can be reached, whereby the 'ready' lamp 19 goes out and the 'test' lamp 20 is one. The individual then leaps and engages the highest switch that can be reached, whereby the calculated distance between the two indications is immediately digitally displayed at 14, reflecting the height of the vertical leap. The 'test' lamp 20 goes out and the unit automatically resets. A reset switch 16 allows the operator to reset the measurement unit 10 at any time, as applicable.

The vertically spaced switches may include a variety of sensing systems exist which detect the presence of an individual, including electric pressure-sensitive switches described herein, sonic detectors, piezoelectric sensors, capacitance sensitive devices, switches and/or circuits sensitive to magnetic fields, and light-beam interruption devices. Likewise, a variety of electronic circuits may be used to convert sensed signals to data suitable for digital display, including integrated circuits illustrated herein, voltage dividers, solid-state devices such as transistors, and microprocessor-based systems. Combinations of such sensing systems and electronic circuits and devices may be utilized for the purpose of measuring vertical leap in addition to those illustrated and described.

While a preferred embodiment of the invention has been described using specific terms, such description is for illustrative purposes only, and it is to be understood that changes and variations may be made without departing from the spirit or scope of the following claims.

What is claimed is:

1. Apparatus for measuring the height of a vertical leap comprising:

a series of vertically spaced pressure-sensitive switches;

means for first recording an indication reflecting a height reached by a person upwardly extending one hand and engaging one of said pressure-sensitive switches from a standing position and subsequently recording a height from said person's upwardly extending hand engaging another one of said switches during a vertical leap; and electrical measurement means coupled to said means for recording adjacent said pressure-sensitive switches to calculate the difference between said indications so as to measure the height of the vertical leap.

2. The apparatus set forth in claim 1 wherein said switches include vertically spaced indicia marking the respective pressure-sensitive portions of said switches.

3. The apparatus set forth in claim 1 wherein said means for recording an indication reflecting the height reached includes a digital display for displaying said calculated vertical leap measurement.

4. The apparatus set forth in claim 1 including means for mounting said measuring apparatus comprising brackets.

5. A method of measuring the height of a vertical leap comprising the steps of:

mounting vertically a series of pressure-sensitive switches;

recording engagement of one of said switches by a person's upwardly extended hand from a standing position so as to produce a first indication of height reached;

recording engagement of another one of said switches by said person's upwardly extended hand during a vertical leap so as to produce a second indication of height reached; and electrically calculating the difference between said first and said second indications so as to determine the height of the vertical leap so as to measure the height of the vertical leap.

* * * * *